US012491028B2

(12) United States Patent
Meglan et al.

(10) Patent No.: US 12,491,028 B2
(45) Date of Patent: Dec. 9, 2025

(54) SYSTEM AND METHODS FOR SUTURING GUIDANCE

(71) Applicant: Covidien LP, Mansfield, MA (US)

(72) Inventors: Dwight Meglan, Westwood, MA (US); Arvind K. Ramadorai, Lexington, MA (US); Meir Rosenberg, Newton, MA (US); Joshua R. Snow, Clinton, CT (US); William J. Peine, Ashland, MA (US)

(73) Assignee: Covidien LP, Mansfield, MA (US)

( * ) Notice: Subject to any disclaimer, the term of this patent is extended or adjusted under 35 U.S.C. 154(b) by 653 days.

(21) Appl. No.: 17/790,964

(22) PCT Filed: Jan. 8, 2021

(86) PCT No.: PCT/US2021/012578
§ 371 (c)(1),
(2) Date: Jul. 6, 2022

(87) PCT Pub. No.: WO2021/158328
PCT Pub. Date: Aug. 12, 2021

(65) Prior Publication Data
US 2023/0015516 A1    Jan. 19, 2023

Related U.S. Application Data

(60) Provisional application No. 62/970,808, filed on Feb. 6, 2020.

(51) Int. Cl.
*A61B 34/10* (2016.01)
*A61B 34/00* (2016.01)
*A61B 90/00* (2016.01)

(52) U.S. Cl.
CPC .............. *A61B 34/10* (2016.02); *A61B 34/25* (2016.02); *A61B 2034/104* (2016.02);
(Continued)

(58) Field of Classification Search
CPC ......... A61B 34/10; A61B 34/25; A61B 34/20; A61B 2034/107; A61B 17/04; A61B 2090/365; A61B 90/37
(Continued)

(56) References Cited

U.S. PATENT DOCUMENTS 6,132,368 A   10/2000  Cooper
6,206,903 B1   3/2001  Ramans
(Continued)

FOREIGN PATENT DOCUMENTS

WO    2018225132 A1   12/2018
WO    2019139935 A1    7/2019
(Continued)

OTHER PUBLICATIONS

Computational Modeling of Wound Suture: A Review; IEEE Reviews in Biomedical Engineering vol. 11, Arnab Chanda et al. (Year: 2018).*
(Continued)

*Primary Examiner* — Jamares Q Washington
(74) *Attorney, Agent, or Firm* — Carter, DeLuca & Farrell, LLP (57) ABSTRACT

A tissue suturing guidance system includes an image capturing device, a display, and a processor in communication with the image capturing device and the display. The image capturing device is configured to capture a suture site. The display is configured to display an image of the suture site. The processor is configured to: determine, based on the image of the suture site, a geometric tissue representation of the suture site; access measured properties of the suture site; determine, based on the measured properties of the suture site, a biomechanical tissue representation of the suture site; and generate, based on the geometric tissue representation
(Continued)

and biomechanical tissue representation of the suture site, a suturing configuration for the suture site.

16 Claims, 4 Drawing Sheets

(52) U.S. Cl.
CPC ... *A61B 2034/105* (2016.02); *A61B 2034/107* (2016.02); *A61B 2034/108* (2016.02); *A61B 2034/254* (2016.02); *A61B 2090/365* (2016.02); *A61B 2090/371* (2016.02)

(58) Field of Classification Search
USPC ..................................................... 382/128
See application file for complete search history.

(56) References Cited

U.S. PATENT DOCUMENTS

| | | |
|---|---|---|
| 6,246,200 B1 | 6/2001 | Blumenkranz et al. |
| 6,312,435 B1 | 11/2001 | Wallace et al. |
| 6,331,181 B1 | 12/2001 | Tierney et al. |
| 6,394,998 B1 | 5/2002 | Wallace et al. |
| 6,424,885 B1 | 7/2002 | Niemeyer et al. |
| 6,441,577 B2 | 8/2002 | Blumenkranz et al. |
| 6,459,926 B1 | 10/2002 | Nowlin et al. |
| 6,491,691 B1 | 12/2002 | Morley et al. |
| 6,491,701 B2 | 12/2002 | Tierney et al. |
| 6,493,608 B1 | 12/2002 | Niemeyer |
| 6,565,554 B1 | 5/2003 | Niemeyer |
| 6,645,196 B1 | 11/2003 | Nixon et al. |
| 6,659,939 B2 | 12/2003 | Moll |
| 6,671,581 B2 | 12/2003 | Niemeyer et al. |
| 6,676,684 B1 | 1/2004 | Morley et al. |
| 6,685,698 B2 | 2/2004 | Morley et al. |
| 6,699,235 B2 | 3/2004 | Wallace et al. |
| 6,714,839 B2 | 3/2004 | Salisbury, Jr. et al. |
| 6,716,233 B1 | 4/2004 | Whitman |
| 6,728,599 B2 | 4/2004 | Wang et al. |
| 6,746,443 B1 | 6/2004 | Morley et al. |
| 6,766,204 B2 | 7/2004 | Niemeyer et al. |
| 6,770,081 B1 | 8/2004 | Cooper et al. |
| 6,772,053 B2 | 8/2004 | Niemeyer |
| 6,783,524 B2 | 8/2004 | Anderson et al. |
| 6,793,652 B1 | 9/2004 | Whitman et al. |
| 6,793,653 B2 | 9/2004 | Sanchez et al. |
| 6,799,065 B1 | 9/2004 | Niemeyer |
| 6,837,883 B2 | 1/2005 | Moll et al. |
| 6,839,612 B2 | 1/2005 | Sanchez et al. |
| 6,840,938 B1 | 1/2005 | Morley et al. |
| 6,843,403 B2 | 1/2005 | Whitman |
| 6,846,309 B2 | 1/2005 | Whitman et al. |
| 6,866,671 B2 | 3/2005 | Tierney et al. |
| 6,871,117 B2 | 3/2005 | Wang et al. |
| 6,879,880 B2 | 4/2005 | Nowlin et al. |
| 6,899,705 B2 | 5/2005 | Niemeyer |
| 6,902,560 B1 | 6/2005 | Morley et al. |
| 6,936,042 B2 | 8/2005 | Wallace et al. |
| 6,951,535 B2 | 10/2005 | Ghodoussi et al. |
| 6,974,449 B2 | 12/2005 | Niemeyer |
| 6,991,627 B2 | 1/2006 | Madhani et al. |
| 6,994,708 B2 | 2/2006 | Manzo |
| 7,048,745 B2 | 5/2006 | Tierney et al. |
| 7,066,926 B2 | 6/2006 | Wallace et al. |
| 7,118,582 B1 | 10/2006 | Wang et al. |
| 7,125,403 B2 | 10/2006 | Julian et al. |
| 7,155,315 B2 | 12/2006 | Niemeyer et al. |
| 7,239,940 B2 | 7/2007 | Wang et al. |
| 7,306,597 B2 | 12/2007 | Manzo |
| 7,357,774 B2 | 4/2008 | Cooper |
| 7,373,219 B2 | 5/2008 | Nowlin et al. |
| 7,379,790 B2 | 5/2008 | Toth et al. |
| 7,386,365 B2 | 6/2008 | Nixon |
| 7,391,173 B2 | 6/2008 | Schena |
| 7,398,707 B2 | 7/2008 | Morley et al. |
| 7,413,565 B2 | 8/2008 | Wang et al. |
| 7,453,227 B2 | 11/2008 | Prisco et al. |
| 7,524,320 B2 | 4/2009 | Tierney et al. |
| 7,574,250 B2 | 8/2009 | Niemeyer |
| 7,594,912 B2 | 9/2009 | Cooper et al. |
| 7,607,440 B2 | 10/2009 | Coste-Maniere et al. |
| 7,666,191 B2 | 2/2010 | Orban, III et al. |
| 7,682,357 B2 | 3/2010 | Ghodoussi et al. |
| 7,689,320 B2 | 3/2010 | Prisco et al. |
| 7,695,481 B2 | 4/2010 | Wang et al. |
| 7,695,485 B2 | 4/2010 | Whitman et al. |
| 7,699,855 B2 | 4/2010 | Anderson et al. |
| 7,713,263 B2 | 5/2010 | Niemeyer |
| 7,725,214 B2 | 5/2010 | Diolaiti |
| 7,727,244 B2 | 6/2010 | Orban, III et al. |
| 7,741,802 B2 | 6/2010 | Prisco |
| 7,756,036 B2 | 7/2010 | Druke et al. |
| 7,757,028 B2 | 7/2010 | Druke et al. |
| 7,762,825 B2 | 7/2010 | Burbank et al. |
| 7,778,733 B2 | 8/2010 | Nowlin et al. |
| 7,803,151 B2 | 9/2010 | Whitman |
| 7,806,891 B2 | 10/2010 | Nowlin et al. |
| 7,819,859 B2 | 10/2010 | Prisco et al. |
| 7,819,885 B2 | 10/2010 | Cooper |
| 7,824,401 B2 | 11/2010 | Manzo et al. |
| 7,835,823 B2 | 11/2010 | Sillman et al. |
| 7,843,158 B2 | 11/2010 | Prisco |
| 7,865,266 B2 | 1/2011 | Moll et al. |
| 7,865,269 B2 | 1/2011 | Prisco et al. |
| 7,886,743 B2 | 2/2011 | Cooper et al. |
| 7,899,578 B2 | 3/2011 | Prisco et al. |
| 7,907,166 B2 | 3/2011 | Lamprecht et al. |
| 7,935,130 B2 | 5/2011 | Williams |
| 7,963,913 B2 | 6/2011 | Devengenzo et al. |
| 7,983,793 B2 | 7/2011 | Toth et al. |
| 8,002,767 B2 | 8/2011 | Sanchez |
| 8,004,229 B2 | 8/2011 | Nowlin et al. |
| 8,012,170 B2 | 9/2011 | Whitman et al. |
| 8,054,752 B2 | 11/2011 | Druke et al. |
| 8,062,288 B2 | 11/2011 | Cooper et al. |
| 8,079,950 B2 | 12/2011 | Stern et al. |
| 8,100,133 B2 | 1/2012 | Mintz et al. |
| 8,108,072 B2 | 1/2012 | Zhao et al. |
| 8,120,301 B2 | 2/2012 | Goldberg et al. |
| 8,142,447 B2 | 3/2012 | Cooper et al. |
| 8,147,503 B2 | 4/2012 | Zhao et al. |
| 8,151,661 B2 | 4/2012 | Schena et al. |
| 8,155,479 B2 | 4/2012 | Hoffman et al. |
| 8,182,469 B2 | 5/2012 | Anderson et al. |
| 8,202,278 B2 | 6/2012 | Orban et al. |
| 8,206,406 B2 | 6/2012 | Orban, III |
| 8,210,413 B2 | 7/2012 | Whitman et al. |
| 8,216,250 B2 | 7/2012 | Orban, III et al. |
| 8,220,468 B2 | 7/2012 | Cooper et al. |
| 8,256,319 B2 | 9/2012 | Cooper et al. |
| 8,285,517 B2 | 10/2012 | Sillman et al. |
| 8,315,720 B2 | 11/2012 | Mohr et al. |
| 8,335,590 B2 | 12/2012 | Costa et al. |
| 8,347,757 B2 | 1/2013 | Duval |
| 8,374,723 B2 | 2/2013 | Zhao et al. |
| 8,418,073 B2 | 4/2013 | Mohr et al. |
| 8,419,717 B2 | 4/2013 | Diolaiti et al. |
| 8,423,182 B2 | 4/2013 | Robinson et al. |
| 8,452,447 B2 | 5/2013 | Nixon |
| 8,454,585 B2 | 6/2013 | Whitman |
| 8,499,992 B2 | 8/2013 | Whitman et al. |
| 8,508,173 B2 | 8/2013 | Goldberg et al. |
| 8,528,440 B2 | 9/2013 | Morley et al. |
| 8,529,582 B2 | 9/2013 | Devengenzo et al. |
| 8,540,748 B2 | 9/2013 | Murphy et al. |
| 8,551,116 B2 | 10/2013 | Julian et al. |
| 8,562,594 B2 | 10/2013 | Cooper et al. |
| 8,594,841 B2 | 11/2013 | Zhao et al. |
| 8,597,182 B2 | 12/2013 | Stein et al. |
| 8,597,280 B2 | 12/2013 | Cooper et al. |
| 8,600,551 B2 | 12/2013 | Itkowitz et al. |
| 8,608,773 B2 | 12/2013 | Tierney et al. |
| 8,620,473 B2 | 12/2013 | Diolaiti et al. |

(56) References Cited

U.S. PATENT DOCUMENTS

| | | |
|---|---|---|
| 8,624,537 B2 | 1/2014 | Nowlin et al. |
| 8,634,957 B2 | 1/2014 | Toth et al. |
| 8,638,056 B2 | 1/2014 | Goldberg et al. |
| 8,638,057 B2 | 1/2014 | Goldberg et al. |
| 8,644,988 B2 | 2/2014 | Prisco et al. |
| 8,666,544 B2 | 3/2014 | Moll et al. |
| 8,668,638 B2 | 3/2014 | Donhowe et al. |
| 8,746,252 B2 | 6/2014 | McGrogan et al. |
| 8,749,189 B2 | 6/2014 | Nowlin et al. |
| 8,749,190 B2 | 6/2014 | Nowlin et al. |
| 8,758,352 B2 | 6/2014 | Cooper et al. |
| 8,761,930 B2 | 6/2014 | Nixon |
| 8,768,516 B2 | 7/2014 | Diolaiti et al. |
| 8,786,241 B2 | 7/2014 | Nowlin et al. |
| 8,790,243 B2 | 7/2014 | Cooper et al. |
| 8,808,164 B2 | 8/2014 | Hoffman et al. |
| 8,816,628 B2 | 8/2014 | Nowlin et al. |
| 8,821,480 B2 | 9/2014 | Burbank |
| 8,823,308 B2 | 9/2014 | Nowlin et al. |
| 8,827,989 B2 | 9/2014 | Niemeyer |
| 8,838,270 B2 | 9/2014 | Druke et al. |
| 8,852,174 B2 | 10/2014 | Burbank |
| 8,858,547 B2 | 10/2014 | Brogna |
| 8,862,268 B2 | 10/2014 | Robinson et al. |
| 8,864,751 B2 | 10/2014 | Prisco et al. |
| 8,864,752 B2 | 10/2014 | Diolaiti et al. |
| 8,903,546 B2 | 12/2014 | Diolaiti et al. |
| 8,903,549 B2 | 12/2014 | Itkowitz et al. |
| 8,911,428 B2 | 12/2014 | Cooper et al. |
| 8,912,746 B2 | 12/2014 | Reid et al. |
| 8,944,070 B2 | 2/2015 | Guthart |
| 8,961,504 B2 | 2/2015 | Hoarau et al. |
| 8,989,903 B2 | 3/2015 | Weir et al. |
| 9,002,518 B2 | 4/2015 | Manzo |
| 9,014,856 B2 | 4/2015 | Manzo et al. |
| 9,016,540 B2 | 4/2015 | Whitman et al. |
| 9,019,345 B2 | 4/2015 | O'Grady et al. |
| 9,043,027 B2 | 5/2015 | Durant et al. |
| 9,050,120 B2 | 6/2015 | Swarup et al. |
| 9,055,961 B2 | 6/2015 | Manzo et al. |
| 9,068,628 B2 | 6/2015 | Solomon et al. |
| 9,078,684 B2 | 7/2015 | Williams |
| 9,084,623 B2 | 7/2015 | Gomez et al. |
| 9,095,362 B2 | 8/2015 | Dachs, II et al. |
| 9,096,033 B2 | 8/2015 | Holop et al. |
| 9,101,381 B2 | 8/2015 | Burbank et al. |
| 9,113,877 B1 | 8/2015 | Whitman et al. |
| 9,138,284 B2 | 9/2015 | Krom et al. |
| 9,144,456 B2 | 9/2015 | Rosa et al. |
| 9,198,730 B2 | 12/2015 | Prisco et al. |
| 9,204,923 B2 | 12/2015 | Manzo et al. |
| 9,226,648 B2 | 1/2016 | Saadat et al. |
| 9,226,750 B2 | 1/2016 | Weir et al. |
| 9,226,761 B2 | 1/2016 | Burbank |
| 9,232,984 B2 | 1/2016 | Guthart et al. |
| 9,241,766 B2 | 1/2016 | Duque et al. |
| 9,241,767 B2 | 1/2016 | Prisco et al. |
| 9,241,769 B2 | 1/2016 | Larkin et al. |
| 9,259,275 B2 | 2/2016 | Burbank |
| 9,259,277 B2 | 2/2016 | Rogers et al. |
| 9,259,281 B2 | 2/2016 | Griffiths et al. |
| 9,259,282 B2 | 2/2016 | Azizian et al. |
| 9,261,172 B2 | 2/2016 | Solomon et al. |
| 9,265,567 B2 | 2/2016 | Orban, III et al. |
| 9,265,584 B2 | 2/2016 | Itkowitz et al. |
| 9,283,049 B2 | 3/2016 | Diolaiti et al. |
| 9,301,811 B2 | 4/2016 | Goldberg et al. |
| 9,314,307 B2 | 4/2016 | Richmond et al. |
| 9,317,651 B2 | 4/2016 | Nixon |
| 9,345,546 B2 | 5/2016 | Toth et al. |
| 9,393,017 B2 | 7/2016 | Flanagan et al. |
| 9,402,689 B2 | 8/2016 | Prisco et al. |
| 9,417,621 B2 | 8/2016 | Diolaiti |
| 9,424,303 B2 | 8/2016 | Hoffman et al. |
| 9,433,418 B2 | 9/2016 | Whitman et al. |
| 9,446,517 B2 | 9/2016 | Burns et al. |
| 9,452,020 B2 | 9/2016 | Griffiths et al. |
| 9,474,569 B2 | 10/2016 | Manzo et al. |
| 9,480,533 B2 | 11/2016 | Devengenzo et al. |
| 9,503,713 B2 | 11/2016 | Zhao et al. |
| 9,550,300 B2 | 1/2017 | Danitz et al. |
| 9,554,859 B2 | 1/2017 | Nowlin et al. |
| 9,566,124 B2 | 2/2017 | Prisco et al. |
| 9,572,529 B2 | 2/2017 | Latimer et al. |
| 9,579,164 B2 | 2/2017 | Itkowitz et al. |
| 9,585,641 B2 | 3/2017 | Cooper et al. |
| 9,615,883 B2 | 4/2017 | Schena et al. |
| 9,623,563 B2 | 4/2017 | Nixon |
| 9,623,902 B2 | 4/2017 | Griffiths et al. |
| 9,629,520 B2 | 4/2017 | Diolaiti |
| 9,662,177 B2 | 5/2017 | Weir et al. |
| 9,664,262 B2 | 5/2017 | Donlon et al. |
| 9,675,354 B2 | 6/2017 | Weir et al. |
| 9,687,312 B2 | 6/2017 | Dachs, II et al. |
| 9,700,334 B2 | 7/2017 | Hinman et al. |
| 9,718,190 B2 | 8/2017 | Larkin et al. |
| 9,730,719 B2 | 8/2017 | Brisson et al. |
| 9,737,199 B2 | 8/2017 | Pistor et al. |
| 9,795,446 B2 | 10/2017 | DiMaio et al. |
| 9,797,484 B2 | 10/2017 | Solomon et al. |
| 9,801,690 B2 | 10/2017 | Larkin et al. |
| 9,814,530 B2 | 11/2017 | Weir et al. |
| 9,814,536 B2 | 11/2017 | Goldberg et al. |
| 9,814,537 B2 | 11/2017 | Itkowitz et al. |
| 9,820,823 B2 | 11/2017 | Richmond et al. |
| 9,827,059 B2 | 11/2017 | Robinson et al. |
| 9,830,371 B2 | 11/2017 | Hoffman et al. |
| 9,839,481 B2 | 12/2017 | Blumenkranz et al. |
| 9,839,487 B2 | 12/2017 | Dachs, II |
| 9,850,994 B2 | 12/2017 | Schena |
| 9,855,102 B2 | 1/2018 | Blumenkranz |
| 9,855,107 B2 | 1/2018 | Labonville et al. |
| 9,872,737 B2 | 1/2018 | Nixon |
| 9,877,718 B2 | 1/2018 | Weir et al. |
| 9,883,920 B2 | 2/2018 | Blumenkranz |
| 9,888,974 B2 | 2/2018 | Niemeyer |
| 9,895,813 B2 | 2/2018 | Blumenkranz et al. |
| 9,901,408 B2 | 2/2018 | Larkin |
| 9,918,800 B2 | 3/2018 | Itkowitz et al. |
| 9,943,375 B2 | 4/2018 | Blumenkranz et al. |
| 9,948,852 B2 | 4/2018 | Lilagan et al. |
| 9,949,798 B2 | 4/2018 | Weir |
| 9,949,802 B2 | 4/2018 | Cooper |
| 9,952,107 B2 | 4/2018 | Blumenkranz et al. |
| 9,956,044 B2 | 5/2018 | Gomez et al. |
| 9,980,778 B2 | 5/2018 | Ohline et al. |
| 10,008,017 B2 | 6/2018 | Itkowitz et al. |
| 10,028,793 B2 | 7/2018 | Griffiths et al. |
| 10,033,308 B2 | 7/2018 | Chaghajerdi et al. |
| 10,034,719 B2 | 7/2018 | Richmond et al. |
| 10,052,167 B2 | 8/2018 | Au et al. |
| 10,085,811 B2 | 10/2018 | Weir et al. |
| 10,092,344 B2 | 10/2018 | Mohr et al. |
| 10,123,844 B2 | 11/2018 | Nowlin |
| 10,188,471 B2 | 1/2019 | Brisson |
| 10,201,390 B2 | 2/2019 | Swarup et al. |
| 10,213,202 B2 | 2/2019 | Flanagan et al. |
| 10,258,416 B2 | 4/2019 | Mintz et al. |
| 10,278,782 B2 | 5/2019 | Jarc et al. |
| 10,278,783 B2 | 5/2019 | Itkowitz et al. |
| 10,282,881 B2 | 5/2019 | Itkowitz et al. |
| 10,335,242 B2 | 7/2019 | Devengenzo et al. |
| 10,405,934 B2 | 9/2019 | Prisco et al. |
| 10,433,922 B2 | 10/2019 | Itkowitz et al. |
| 10,464,219 B2 | 11/2019 | Robinson et al. |
| 10,485,621 B2 | 11/2019 | Morrissette et al. |
| 10,500,004 B2 | 12/2019 | Hanuschik et al. |
| 10,500,005 B2 | 12/2019 | Weir et al. |
| 10,500,007 B2 | 12/2019 | Richmond et al. |
| 10,507,066 B2 | 12/2019 | DiMaio et al. |
| 10,510,267 B2 | 12/2019 | Jarc et al. |
| 10,524,871 B2 | 1/2020 | Liao |
| 10,548,459 B2 | 2/2020 | Itkowitz et al. |
| 10,575,909 B2 | 3/2020 | Robinson et al. |

(56) References Cited

U.S. PATENT DOCUMENTS

| | | | |
|---|---|---|---|
| 10,592,529 | B2 | 3/2020 | Hoffman et al. |
| 10,595,946 | B2 | 3/2020 | Nixon |
| 10,881,469 | B2 | 1/2021 | Robinson |
| 10,881,473 | B2 | 1/2021 | Itkowitz et al. |
| 10,898,188 | B2 | 1/2021 | Burbank |
| 10,898,189 | B2 | 1/2021 | McDonald, II |
| 10,905,506 | B2 | 2/2021 | Itkowitz et al. |
| 10,912,544 | B2 | 2/2021 | Brisson et al. |
| 10,912,619 | B2 | 2/2021 | Jarc et al. |
| 10,918,387 | B2 | 2/2021 | Duque et al. |
| 10,918,449 | B2 | 2/2021 | Solomon et al. |
| 10,932,873 | B2 | 3/2021 | Griffiths et al. |
| 10,932,877 | B2 | 3/2021 | Devengenzo et al. |
| 10,939,969 | B2 | 3/2021 | Swarup et al. |
| 10,939,973 | B2 | 3/2021 | DiMaio et al. |
| 10,952,801 | B2 | 3/2021 | Miller et al. |
| 10,965,933 | B2 | 3/2021 | Jarc |
| 10,966,742 | B2 | 4/2021 | Rosa et al. |
| 10,973,517 | B2 | 4/2021 | Wixey |
| 10,973,519 | B2 | 4/2021 | Weir et al. |
| 10,984,567 | B2 | 4/2021 | Itkowitz et al. |
| 10,993,773 | B2 | 5/2021 | Cooper et al. |
| 10,993,775 | B2 | 5/2021 | Cooper et al. |
| 11,000,331 | B2 | 5/2021 | Krom et al. |
| 11,013,567 | B2 | 5/2021 | Wu et al. |
| 11,020,138 | B2 | 6/2021 | Ragosta |
| 11,020,191 | B2 | 6/2021 | Diolaiti et al. |
| 11,020,193 | B2 | 6/2021 | Wixey et al. |
| 11,026,755 | B2 | 6/2021 | Weir et al. |
| 11,026,759 | B2 | 6/2021 | Donlon et al. |
| 11,040,189 | B2 | 6/2021 | Vaders et al. |
| 11,045,077 | B2 | 6/2021 | Stern et al. |
| 11,045,274 | B2 | 6/2021 | Dachs, II et al. |
| 11,058,501 | B2 | 7/2021 | Tokarchuk et al. |
| 11,076,925 | B2 | 8/2021 | DiMaio et al. |
| 11,090,119 | B2 | 8/2021 | Burbank |
| 11,096,687 | B2 | 8/2021 | Flanagan et al. |
| 11,098,803 | B2 | 8/2021 | Duque et al. |
| 11,109,925 | B2 | 9/2021 | Cooper et al. |
| 11,116,578 | B2 | 9/2021 | Hoffman et al. |
| 11,129,683 | B2 | 9/2021 | Steger et al. |
| 11,135,029 | B2 | 10/2021 | Suresh et al. |
| 11,147,552 | B2 | 10/2021 | Burbank et al. |
| 11,147,640 | B2 | 10/2021 | Jarc et al. |
| 11,154,373 | B2 | 10/2021 | Abbott et al. |
| 11,154,374 | B2 | 10/2021 | Hanuschik et al. |
| 11,160,622 | B2 | 11/2021 | Goldberg et al. |
| 11,160,625 | B2 | 11/2021 | Wixey et al. |
| 11,161,243 | B2 | 11/2021 | Rabindran et al. |
| 11,166,758 | B2 | 11/2021 | Mohr et al. |
| 11,166,770 | B2 | 11/2021 | DiMaio et al. |
| 11,166,773 | B2 | 11/2021 | Ragosta et al. |
| 11,173,597 | B2 | 11/2021 | Rabindran et al. |
| 11,185,378 | B2 | 11/2021 | Weir et al. |
| 11,191,596 | B2 | 12/2021 | Thompson et al. |
| 11,197,729 | B2 | 12/2021 | Thompson et al. |
| 11,213,360 | B2 | 1/2022 | Hourtash et al. |
| 11,221,863 | B2 | 1/2022 | Azizian et al. |
| 11,234,700 | B2 | 2/2022 | Ragosta et al. |
| 11,241,274 | B2 | 2/2022 | Vaders et al. |
| 11,241,290 | B2 | 2/2022 | Waterbury et al. |
| 11,259,870 | B2 | 3/2022 | DiMaio et al. |
| 11,259,884 | B2 | 3/2022 | Burbank |
| 11,272,993 | B2 | 3/2022 | Gomez et al. |
| 11,272,994 | B2 | 3/2022 | Saraliev et al. |
| 11,291,442 | B2 | 4/2022 | Wixey et al. |
| 11,291,513 | B2 | 4/2022 | Manzo et al. |
| 2004/0009459 | A1 * | 1/2004 | Anderson ............... G06T 19/00 703/11 |
| 2013/0123801 | A1 | 5/2013 | Umasuthan et al. |
| 2014/0005684 | A1 * | 1/2014 | Kim ..................... A61B 34/76 606/130 |
| 2019/0069957 | A1 | 3/2019 | Barral et al. |

FOREIGN PATENT DOCUMENTS

| | | | | |
|---|---|---|---|---|
| WO | WO-2019210322 | A1 * | 10/2019 | ........... A61B 90/361 |
| WO | WO-2020016870 | A2 * | 1/2020 | ........... A61B 5/0036 |

OTHER PUBLICATIONS

International Search Report mailed Apr. 21, 2021 and Written Opinion completed Apr. 12, 2021 corresponding to counterpart Int'l Patent Application PCT/US21/12578.

Zhang et al., "Deformable Models for Surgical Simulation: A Survey", IEEE Reviews in Biomedical Engineering, vol. 11, pp. 143-164 (Nov. 14, 2017).

Cueto et al., "Real time simulation for computational surgery: a review", Adv. Model. and Simul. in Eng. Sci. 1, 11 (Apr. 29, 2014).

* cited by examiner

SYSTEM AND METHODS FOR SUTURING GUIDANCE

CROSS-REFERENCE TO RELATED APPLICATIONS

[000.1] The present application is a U.S. National Stage Application filed under 35 U.S.C. § 371 (a) claiming the benefit of and priority to International Pat. Application No. PCT/US21/12578, filed Jan. 8, 2021, which claims the benefit of and priority to U.S. Provisional Patent Application Ser. No. 62/970,808, filed Feb. 6, 2020, the entire disclosures of each of which being incorporated by reference herein.

FIELD

The present disclosure is generally related to a surgical system, and more particularly, to a surgical system for performing suturing guidance.

BACKGROUND

Surgical suturing is an integral part of repairing tissue after a wound or surgical incision from minimally invasive surgery, among other things. Typically, suturing is a manual process where the clinician is left to their judgment and/or experience of the situation to determine various aspects of the suturing process to achieve proper suturing of the tissue.

Surgical suturing remains one of the most challenging tasks in robotic assisted surgery. Surgical suturing includes a number of sub-tasks that are a cognitive challenge to a surgeon or clinician. These sub-tasks include (1) locating an appropriate needle penetration point; (2) grasping a needle perpendicularly to a pair of jaws; (3) envisioning of the needle trajectory; (4) approximating the abating tissue to the envisioned needle exit site; (5) inserting a tip of a needle (e.g., a curved needle) in the desired location; (6) rotating the needle in a trajectory that follows the needle curvature; (7) grasping the protruding needle or tip of the needle; (8) pulling the needle out in a path that follows the needle curvature; and (9) repeating or tying a suture attached to the needle.

Each of the above sub-tasks is cognitively challenging. This is particularly true in situations where the tool kinematics are difficult to envision (curved or flexible tools) or in situations where the needle is not perpendicular to the pair of jaws of the tool or instrument.

Accordingly, there is an interest to reduce the cognitive load associated with sub-tasks 2-8 above by visually communicating the proposed needle trajectory and automatically executing the desired path under surgeon supervision.

There is interest in supplementing the judgment or experience of clinicians and improving the efficacy of suturing outcomes.

SUMMARY

The present disclosure provides tissue suturing guidance systems. The tissue suturing guidance systems include an image capturing device, a display, and a processor in communication with the image capturing device and the display. The image capturing device is configured to capture an image of a suture site. The display is configured to display the image of the suture site. The processor is configured to: determine, based on the image of the suture site, a geometric tissue representation of the suture site; access measured properties of the suture site; determine, based on the measured properties of the suture site, a biomechanical tissue representation of the suture site; and generate, based on the geometric tissue representation and biomechanical tissue representation of the suture site, a suturing configuration for the suture site.

In various embodiments of the system, the image capturing device is a stereo-endoscope that provides stereoscopic images.

In various embodiments of the system, in determining the geometric tissue representation, the processor is configured to perform three-dimensional surface reconstruction based on the stereoscopic images to determine the geometric tissue representation of the suture site.

In various embodiments of the system, the image capturing device is further configured to perform multi-spectral imaging of the suture site to provide the measured properties of the suture site.

In various embodiments of the system, the tissue suturing guidance system includes a memory storing tissue types and distributions, wherein the processor is configured to determine the measured properties of the suture site based on the stored tissue types and distributions.

In various embodiments of the system, in generating the suturing configuration, the processor is configured to simulate placements of sutures at target locations based on the geometric and biomechanical tissue representations of the suture site to generate the suturing configuration for the suture site.

In various embodiments of the system, in generating the suturing configuration, the processor is configured to determine an effectiveness of the suturing configuration based on whether a simulation-derived pressure across a tissue-to-tissue interface of the suture site, as calculated by a biomechanically-based simulation of the suturing site, is within a predetermined range of pressures that promote tissue regrowth.

In various embodiments of the system, the tissue-to-tissue interface corresponds to tissue faces of the suture site based on the geometric tissue model of the suture site.

In various embodiments of the system, the processor is configured to receive input of a desired suture placement, and in generating the suturing configuration, the processor is configured to generate the suturing configuration based on the desired suture placement.

In various embodiments of the system, the processor is configured to update the suturing configuration during a progression of a suture procedure.

In various embodiments of the system, the suturing configuration includes at least one of suture type, suture tension, suture loop frequency, needle, suture placement, or suture pathway.

In various embodiments of the system, the progression includes one of a clinician or a robotic surgical system performing the suture procedure.

In various embodiments of the system, the display is configured to overlay the suturing configuration over the image of the suture site.

In another aspect, the present disclosure provides a method of tissue suturing guidance. The method includes: capturing by an image capturing device a suture site; displaying by a display an image of the suture site; determining, based on the image of the suture site, a geometric tissue representation of the suture site; accessing measured properties of the suture site; determining, based on the measured properties of the suture site, a biomechanical tissue representation of the suture site; and generating, based on the geometric tissue representation and biomechanical tissue representation of the suture site, a suturing configuration for the suture site.

In various embodiments of the method, determining the geometric tissue representation of the suture site includes performing three-dimensional surface reconstruction to determine the geometric tissue representation of the suture site.

In various embodiments of the method, the method includes performing multi-spectral imaging on the suture site to provide the measured properties of the sutures site.

In various embodiments of the method, generating the suturing configuration includes simulating placements of sutures at target locations based on the geometric and biomechanical tissue representations of the suture site.

In various embodiments of the method, the method includes receiving input of a desired suture placement, and determining an effectiveness of the suturing configuration based on whether a simulation-derived pressure across a tissue-to-tissue interface of the suture site, as calculated by a biomechanically-based simulation of the suturing site, is within a predetermined range of pressures that promote tissue regrowth.

In various embodiments of the method, the method includes updating the suturing configuration during a progression of a suture procedure.

In various embodiments of the method, the method includes overlaying the suturing configuration on the image of the suture site.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Embodiments of the presently disclosed tissue suturing guidance system are described in detail with reference to the drawings, in which like reference numerals designate identical or corresponding elements in each of the several views.

As used herein, the term "clinician" refers to a doctor, nurse, or other care provider and may include support personnel. In the following description, well-known functions or construction are not described in detail to avoid obscuring the disclosure in unnecessary detail.

The present disclosure is generally directed to a tissue suturing guidance system configured to assess a suture site and generate an effective suture configuration for the suture site based on the assessment of the suture site. The particular illustrations and embodiments disclosed herein are merely exemplary and do not limit the scope or applicability of the disclosed technology.

Figure 1:
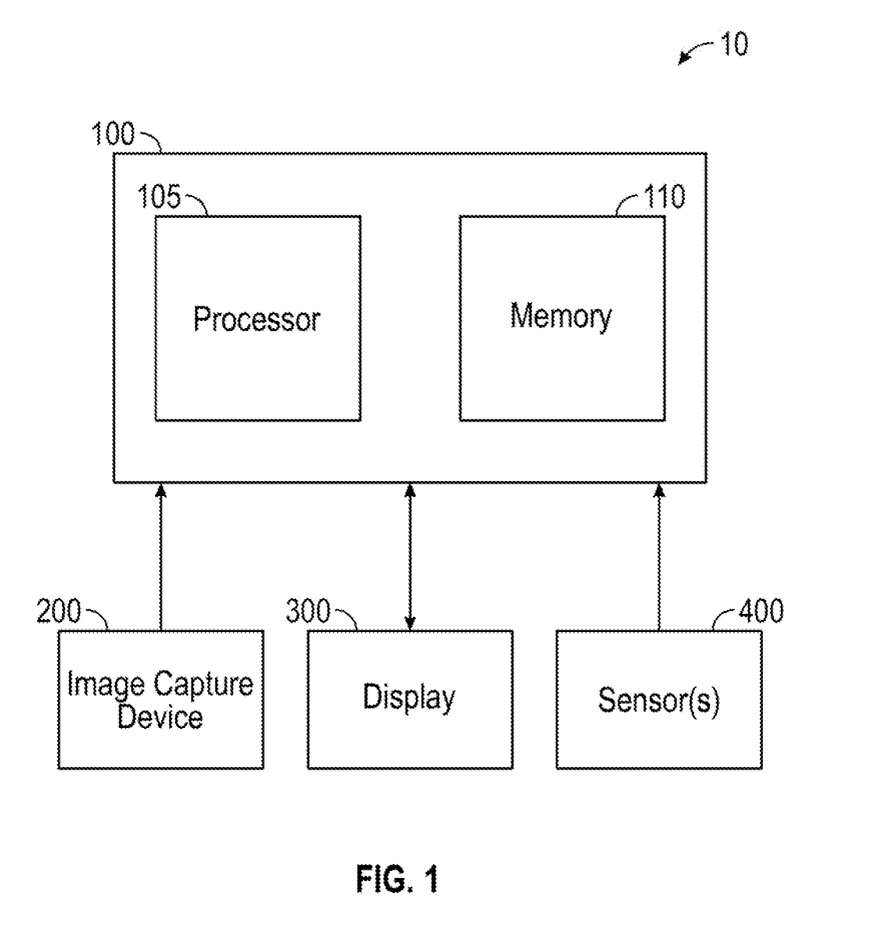
FIG. 1 is a block diagram of an exemplary tissue suturing guidance system, provided in accordance with aspects of the present disclosure.

With reference to FIG. 1, an exemplary tissue suturing guidance system 10 is provided in accordance with aspects of the present disclosure. The tissue suturing guidance system 10 generally includes a controller 100, an image capture device 200, a display 300, and one or more sensors 400. The tissue suturing guidance system 10 is detailed herein as a guidance system for tissue suturing for a person, however, other applications are also contemplated. Aspects of the tissue suturing guidance system 10 will be described in connection with a suture site.

The controller 100 includes a processor 105 and a memory 110. The processor 105 can be any programmable device that executes machine instructions, such as one or more of a central processing unit, microcontroller, digital signal processor, graphics processing unit, field programmable gate array, and/or programmable logic device, among others. The memory 110 can include volatile memory, such as random access memory, and/or non-volatile memory, such as flash memory and/or magnetic storage. As explained in more detail below, the memory 110 includes software instructions which implement image processing and tissue-related computations to determine suture placement for a particular suture site. The software instructions are executed by the processor 105 to carry out the processing and computations, which will be describe in more detail later herein.

In various embodiments, a suture site may be on or within the body of a person. The image capture device 200 may be of a type and may have a position that is appropriate for the suture site. For example, where the suture site is within the body of a person, the image capture device 200 may be a stereo-endoscope that is positioned within the body cavity of a person. As discussed in more detail below, a stereo-endoscope can implement surface scanning techniques such that a three-dimensional representation can be constructed of the suture site. Where the suture site is on the body of a person, the image capture device 200 may be a stereoscopic camera that is positioned on operating room equipment external to the person. Other variations of the image capturing device and its positioning are contemplated to be within the scope of the present disclosure.

In the illustration of FIG. 1, the image capture device 200 is communicatively coupled to the controller 100, which is communicatively coupled to the display 300. In various embodiments, the display 300 may be a flat panel display, such as an LED display, and can be a standalone display or can be a display that is integrated with another device/equipment. In various embodiments, the display 300 may be a headset display, such as the display of an augmented reality headset. Other variations of the display 300 are contemplated to be within the scope of the present disclosure.

The sensor(s) 400 of the tissue suturing guidance system 10 will be described in more detail below. For now, it is sufficient to note that the sensor(s) 400 can include a multi-spectral imaging device and/or an optical coherence tomography device, and can measure properties of the tissue to be sutured, such as, without limitation, tissue moisture or density. Such tissue property measurements can be used by the controller 100 to determine a biomechanical representation of the tissue of the suture site.

Figure 2A:
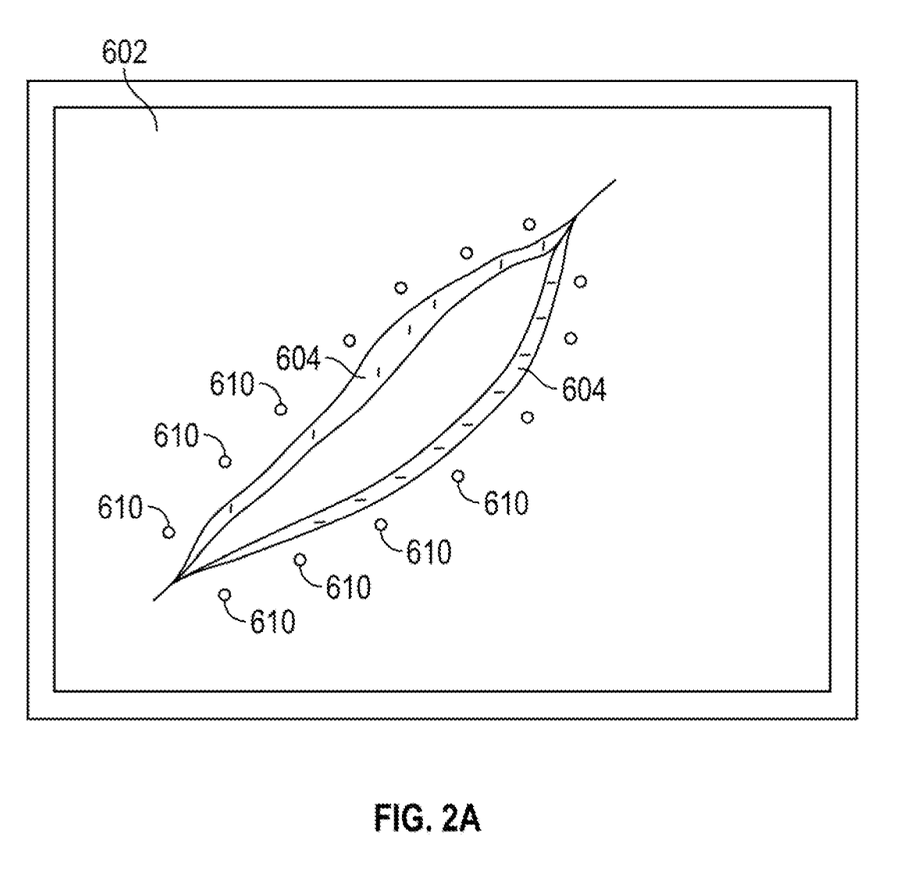
FIG. 2A is a diagram of a display showing an exemplary suture site, in accordance with aspects of the present disclosure, prior to a surgical suturing procedure.
Figure 2B:
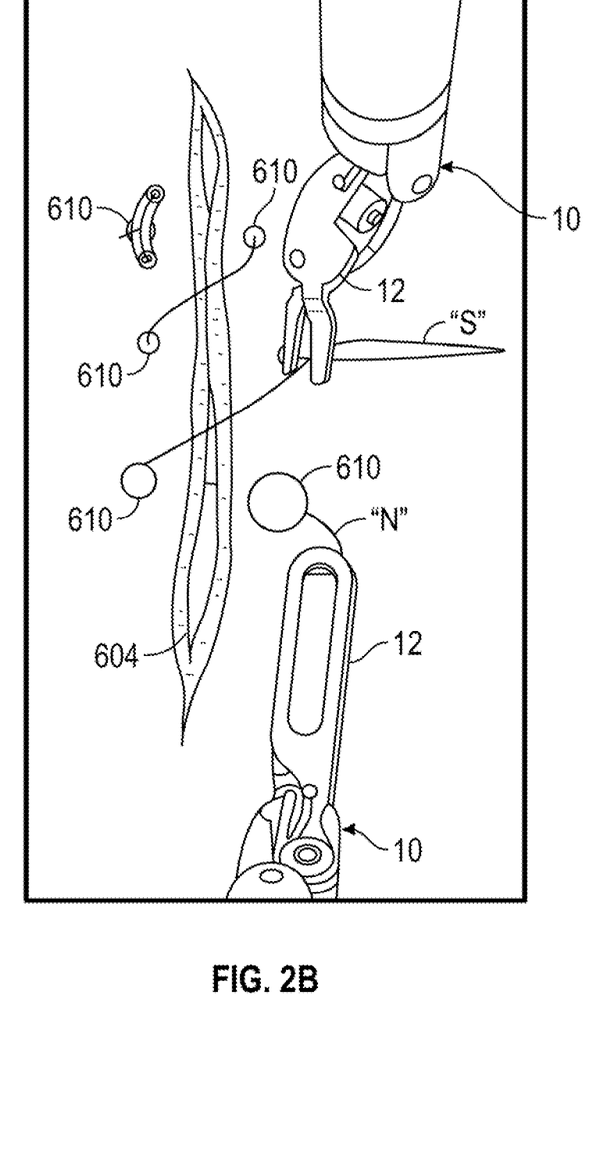
FIG. 2B is a diagram of the display showing the exemplary suture site of FIG. 2A during the surgical suturing procedure.

FIGS. 2A and 2B show a display of an image or video of an exemplary suture site 602 that is captured by an image capturing device 200. As mentioned above, the suture site 602 can be on a person's body or within a person's body.

Clinicians generally rely on their own judgment and experience for placing sutures to re-approximate tissue. The objective is to place tissue faces 604 in approximation to one another in a way that allows as much as possible of those tissue faces 604 to be in contact and to do so with the appropriate pressure to be placed upon and maintained over the entirety of the tissue interface. Parameters for achieving that objective include: choice of the type of suture "S" and its attached needle "N", placement location/pathway, frequency of suture loops, and/or the tension of the suture "S" created in the process of knot creation, among other parameters. In accordance with aspects of the present disclosure, a tissue suturing guidance system can assess a suture site 602 to provide recommendations with respect to such parameters to a clinician.

As an example, the image/video of the suture site can be augmented, in real-time, to include markers 610 that indicate the suture/needle placement locations and/or pathway for re-approximating the tissue of the suture site 602. As described below, the locations of the markers 610, among other things, can be determined, in real-time, by the tissue suturing guidance system and can be dynamically updated and displayed before and during the suturing procedure. Accordingly, if a clinician deviates from the indicated locations and/or pathways, the locations of the markers 610 can dynamically change based on the actual needle/suture "N/S" placements performed by the clinician. For example, the markers 610 can change color from/between green/yellow/red when the locations and/or pathways are acceptable/partially-acceptable/not-acceptable, or the markers 610 can begin to pulse, change shape or the like for any predetermined condition.

Figure 3:
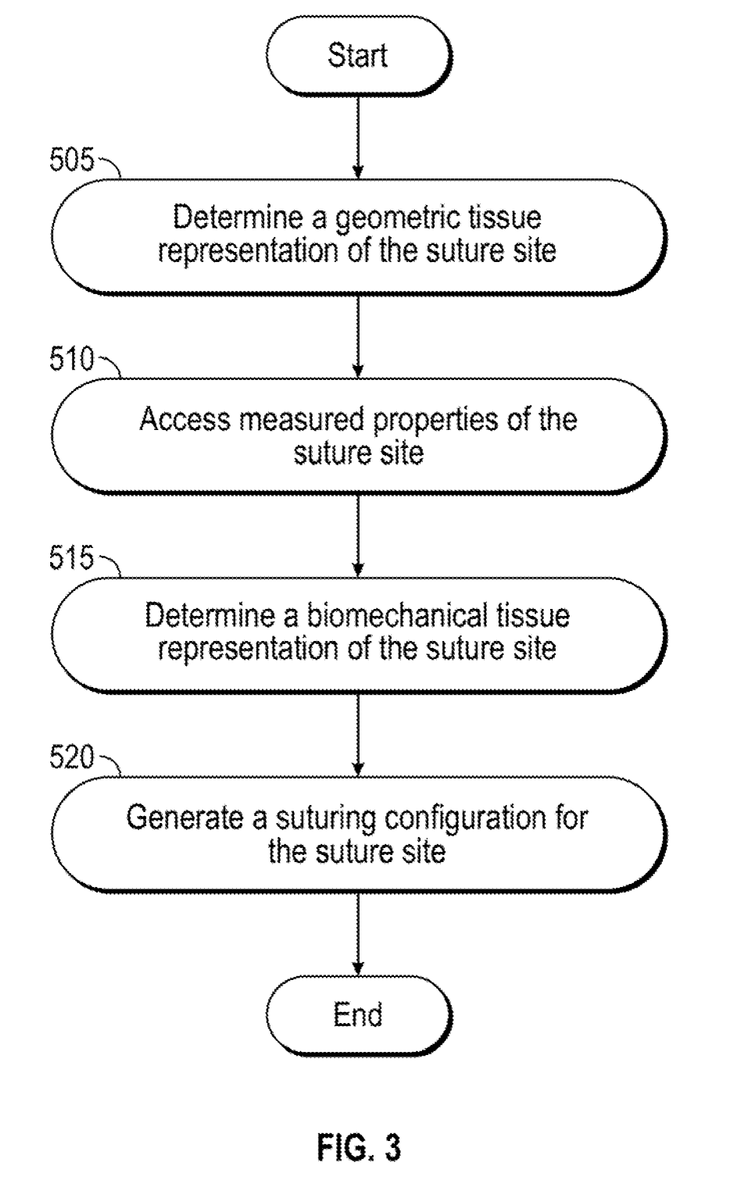
FIG. 3 is a flow diagram of an exemplary operation of generating a suture configuration for a suture site, in accordance with aspects of the present disclosure.

With reference to FIG. 3, there is shown a flow diagram of an exemplary operation for providing a suture configuration for a suture site. Generally, the operation of FIG. 3 accesses images and measurements of a suturing site, in real-time, to determine a geometric representation of the suture site and to determine a biomechanical representation of the suture site. Those representations are then used to determine suturing parameters that allow as much as possible of the tissue faces to be in contact and for the appropriate pressure to be placed upon and maintained over the entirety of the tissue interface. Aspects of the disclosed procedure are implemented by machine instructions executed by a processor.

At step 505, and with reference also to FIG. 1, processor 105 of the tissue guidance system 10 is configured to determine a geometric tissue representation of the suture site. In determining the geometric tissue representation of the suture site, the image capture device 200 of the tissue suturing guidance system 10 captures stereoscopic images and/or video of the suture site, in real-time. For convenience, the following description will utilize images, but it is understood that the disclosed embodiments and techniques apply to videos as well. The captured images are accessed by the processor 105 to perform real-time three-dimensional surface reconstruction based on the captured images. The processor 105 generates a real-time geometric tissue representation of the suture site based on the captured images and the three-dimensional surface reconstruction. Persons skilled in the art will recognize techniques for performing three-dimensional surface reconstruction, including finite element modeling, boundary element techniques, and/or meshless techniques, among others.

At step 510, the tissue suturing guidance system 10 accesses one or more properties of the suture site. To obtain the one or more measured properties from the suture site, such as, for example, the type of tissue around the suture site, the tissue suturing guidance system 10 may perform multi-spectral imaging of the suture site and/or optical coherence tomography, among other things. Techniques for using multi-spectral imaging to determine various tissue properties are described in, for example, U.S. Pat. No. 8,961,504, which is hereby incorporated by reference in its entirety. Techniques for performing optical coherence tomography are described in, for example, U.S. Pat. No. 9,572,529, which is hereby incorporated by reference in its entirety. In some embodiments, the multi-spectral imaging and/or optical coherence tomography may be performed by either the image capture device 200 or by a standalone image capture device.

In step 515, a biomechanical tissue representation of the suture site is determined based on the one or more measured properties of the suture site, such as based on tissue moisture, distribution of tissue moisture, and/or tissue density. Various techniques are contemplated to determine the biomechanical tissue representation, such as, for example, real-time computational physics modeling of tissue and/or surgical simulation techniques. Various techniques are described by, for example, Zhang et al., "Deformable Models for Surgical Simulation: A Survey", IEEE Reviews in Biomedical Engineering, vol. 11, pp. 143-164 (Nov. 14, 2017), and by Cueto et al., "Real time simulation for computational surgery: a review", Adv. Model. and Simul. in Eng. Sci. 1, 11 (Apr. 29, 2014), the entire contents of both of which are hereby incorporated by reference.

At step 520, a suturing configuration for the suture site is generated based on the geometric tissue representation and the biomechanical tissue representation of the suture site. The geometric tissue representation provides information about the shape of the suture site and the biomechanical tissue representation provides information about the behavior of the tissue of the suture site. In generating the suture configuration, various choices of sutures, placements of the sutures at target locations, and suture tension, among other things, are simulated to determine effectiveness of various suturing configurations. The suture configuration can include suture type, suture tension, suture loop frequency, suture placement, and/or suture pathway, among other things. Effectiveness of various suturing configurations are determined based on whether a simulation-derived pressure across a tissue-to-tissue interface of the suture site (e.g., where the tissue faces of the suture site are in communication) is substantially uniform and is within a predetermined range appropriate for tissue regrowth or reconnection. In other words, effectiveness may be determined based on the tissue approximation that allows as much of the tissue faces as possible to be in contact with one another with an appropriate pressure placed upon the tissue faces and maintained over the entirety of the tissue faces. The determination of tissue approximation and pressure across the tissue-to-tissue interface can be determined based on the geometric tissue representation and the biomechanical tissue representation.

In various embodiments, the predetermined or appropriate pressure can be based on input from a clinician and/or a robotic surgical system.

In various embodiments, predetermined or appropriate pressure may be based on wound healing research directed towards the achieving appropriate tissue contact pressure including a minimum pressure and a maximum pressure threshold to avoid adverse effects (e.g., tissue remodeling and/or tissue failure) caused from inadequate or excessive pressure on the tissue interface.

In various embodiments, the suture configuration simulations are compared to identify a particular suture configuration that performs better than the rest. The processor 105 causes the display 300 to display, in real-time, the identified suture configuration by overlaying the suture configuration over the image of the suture site and/or overlying markers 610 over the image of the surgical site, as shown, for example, in FIGS. 2A and 2B, and by displaying the suture configuration parameters, such as suture type and suture tensions (not shown).

In some embodiments, the processor 105 of the tissue suturing guidance system 10 is further configured to receive input from a clinician or robotic surgical system of a desired placement of the needle "N" and/or the suture "S" in the suture site. In practice, the clinician or the robotic surgical system manipulates forceps jaws 12 of a surgical instrument 10 to change a location and pose of the needle "N", and to draw the suture "S" through the tissue. Based on the desired placement, the processor 105 adjusts the suturing configuration by simulating the desired placement based on the geometric and biomechanical tissue representations of the suture site. The suture configuration is adjusted to increase the effectiveness of the suture configuration in view of the desired placement. The processor 105 causes the display 300 to display, in real-time, the suture configuration by overlaying the suture configuration over the image of the suture site.

In some embodiments, the processor 105 of the tissue suturing guidance system 10 is further configured to update the suture configuration during progression of a suture procedure by either a clinician or robotic surgical system. In updating the suture configuration during progression of the suture procedure, the processor 105 uses the already placed sutures "S" in the geometric and biomechanical tissue representations and determines a suture configuration for the remainder of the suture site. The processor 105 causes the display 300 to display, in real-time, the updated suture configuration by overlaying the updated suture configuration over the image of the suture site.

Additionally, in embodiments, the tissue suturing guidance system 10 may be configured to provide assessment and feedback during the progression of the suture procedure and display the assessment and feedback of the progression of the suture procedure on display 300. Feedback of the progression of the suture procedure may include, for example, real-time simulation-derived estimates of the pressure across a tissue-to-tissue interface and a suture-tissue contact to determine if there is inadequate or excessive pressure on the tissue interface. In the event, the assessment and feedback provided by the tissue suturing guidance system 10 estimates that there is inadequate or excessive pressure on the tissue interface, the tissue suturing guidance system 10 may provide an alert and/or remedial actions to adjust pressure across a tissue-to-tissue interface.

In accordance with an embodiment of the present disclosure, the tissue suturing guidance system 10 and/or the processor 105 are configured and capable of: (1) using image processing, in real-time, to assess the location and pose of the needle "N" relative to the jaws 12; and (2) establishing the combined tool-needle kinematics. Once the tool-needle kinematics have been established the tissue suturing guidance system 10 and/or the processor 105 is/are able to simulate desired tool/needle trajectories similar to the ways these trajectories. In this manner, sub-tasks 2-8 (detailed above) can now be performed automatically or manually per the clinician's choice. Specifically, these sub-tasks include, at least: (2) grasping a needle perpendicularly to a pair of jaws; (3) envisioning of the needle trajectory; (4) approximating the abating tissue to the envisioned needle exit site; (5) inserting a tip of a needle (e.g., a curved needle) in the desired location; (6) rotating the needle in a trajectory that follows the needle curvature; (7) grasping the protruding needle or tip of the needle; (8) pulling the needle out in a path that follows the needle curvature.

It is further contemplated, in accordance with the present disclosure, that the tissue suturing guidance system 10 and/or the processor 105 is/are capable of: monitoring and identifying an appropriate needle penetration point (marker 610), and virtually mark it by "pointing" a tip of the needle "N" at that penetration point; using image processing to identify the location, orientation, and pose of the needle "N" in the jaws 12; generating a path (a circle or arc in the case of a curved needle) that simulates in 3D the needle trajectory; enabling the clinician to bring the abating tissue to the expected needle exit point; enabling the clinician to command the system to execute the suturing task; and enabling the clinician to grasp the protruding needle "N" and command the tissue suturing guidance system 10 and/or the processor 105.

As discussed above, the present disclosure relates to using vision to identify the orientation of the needle "N" with respect to the jaws 12, and then updating the kinematic controller to allow the user, and to allow the automatic motion planning, to place the tip of the needle "N" and follow the curvature path defined by the curve of the needle "N".

In a further embodiment, in accordance with the present disclosure, the tissue suturing guidance system 10 and/or the processor 105 is/are capable of assessing properties of the underlying tissue which is the target for suturing, e.g., suture site 602 and/or tissue faces 604. The tissue properties may include, and are not limited to tissue integrity (such as identifying extent of thermal damage from cautery); tissue density and stiffness (to ensure that selected needle "N" is appropriately gauged to be able to penetrate the tissue without breaking); and presence of tissue scarring (wherein barbed sutures "S" may be used to help penetrate the tissue). The tissue suturing guidance system 10 and/or the processor 105 may be capable of identifying a distance between a proposed needle penetration point (e.g., marker 610) and an edge of the tissue (e.g., tissue face 604) and/or a location of where the tissue separates or an incision begins/ends.

As briefly mentioned above, the tissue suturing guidance system 10 and/or the processor 105 is/are capable of identifying properties of the needle "N" and/or the material of the suture "S", for example, and not limited to, a thickness or gauge of the needle "N", a radius of curvature of the needle "N", a diameter of the suture "S", and/or a surface feature of the suture "S" (e.g., barbed or non-barbed/smooth).

The tissue suturing guidance system 10 and/or the processor 105 may be capable of issuing warnings to a surgeon of clinician if/when the combination of the proposed needle penetration point (e.g., marker 610) and the information set forth above (e.g., properties about the tissue, needle "N" and/or suture "S") may lead to undesired impact on the tissue and the like.

Further, the tissue suturing guidance system 10 and/or the processor 105 may be capable of providing guidance to the direction of movement and/or orientation of the needle "N", prior to or during a surgical suturing procedure whereby the tissue suturing guidance system 10 and/or the processor 105 provides information to the robotic surgical system to adjust the robotic surgical arms and components thereof so as to make adjustments to the surgical suturing procedure to ensure that the surgical suturing procedure may be completed within the kinematic joint limits of the robotic surgical system.

However, in accordance with a further aspect of the present disclosure, the tissue suturing guidance system 10 and/or the processor 105 is/are capable of, may be modified to or configured to a vision guidance system for identifying and tracking an electronic radiation source (not shown) that is used in intra-operative radiation therapy procedures and applied to potential cancer sites after a tumor or the like is removed. For example, the radiation source may be grasped by the jaws 12 of a robotic tool. The vision guidance system could identify the orientation of the radiation source relative to the jaws 12 and then treat the "j aw-tool" assembly as a new end-effector. The vision guidance system could then scan the radiation source in a predefined path over the target tissue to cover the entire area with a uniform and known dose of radiation. The robotic surgical system may then alter kinematic equations for movement of robotic surgical arms to adjust for the "jaw-tool" assembly. While this may be achieved mechanically by using a jig or the like to align the tool in a predefined configuration with the jaws 12, by using the vision guidance system to determine the relative position between the radiation source and the jaws 12, a more flexible approach is possible and any grasped orientation of the radiation source by the jaws 12 may be used.

It is further envisioned and contemplated in accordance with the present disclosure that a vision guidance system may be used to identify the surgical tool and an orientation of an item grasped by the jaws 12 of the tool relative to the jaws 12 and/or the tool; monitor the grasped orientation during a surgical task or procedure and actively adjust the kinematics and dynamics of the movement of the tool and/or the surgical robotic arms and the like; track the target tissue and adjust the motion of the tool and/or the surgical robotic arms accordingly; measure a defection of the tool and adjust the kinematics/dynamics of the end-effector accordingly (e.g., for non-rigid tools like a bare laser fiber and the like); identify a three-dimensional ("3D") position of the tool relative to the jaws 12; and/or provide information to the robotic surgical system such that the robotic surgical system may adjust the kinematics and dynamics of the robotic surgical arm to control the jaw/tool assembly as part of an end-effector thereof.

It is also contemplated, and in accordance with the present disclosure, that the tool may be a tactile probe, whereby the robotic surgical system may then combine any tactile feedback from the tool into the adjusted kinematics for the surgical robotic arms.

In accordance with the present disclosure, it is further contemplated that the tissue suturing guidance system 10 and/or the processor 105 may be tuned or configured to recognize and track the suture "S" as well. Specifically, the tissue suturing guidance system 10 and/or the processor 105 may recognize and track the orientation and length on the suture "S". In an embodiment, it is contemplated that the suture "S" may be provided with metrical markings along an entire length thereof, and wherein the tissue suturing guidance system 10 and/or the processor 105 may be configured to recognize and track these metrical markings of the suture "S" to determine and calculate of a length of the suture "S" is increasing or stretching during the surgical procedure, over time. In this manner, the tissue suturing guidance system 10 and/or the processor 105 may provide feedback to the robotic surgical system whereby the robotic surgical system and/or controller/processor 105 thereof may make real-time active adjustments to the surgical robotic arm and/or the tool to accommodate for any changes in the length of the suture "S".

In accordance with aspects of the present disclosure, the tissue suturing guidance system 10 may include an artificial intelligence learning machine that implements machine learning. Training of the artificial intelligence learning machine may be based on, for example, images of suture procedures performed by clinicians or robotic surgical systems, which are labeled with regard to simulation-derived pressure across a tissue-to-tissue interface, suturing adjustments, suggested remedial actions, and/or success of outcomes. The images or videos of suture procedures performed by clinicians or robotic surgical systems may be used for machine learning to improve the initial placement of the suture at the target location prior to simulation. The pressure across a tissue-to-tissue interface during the simulation of suturing configurations may be determined by the trained artificial intelligence learning machine to assist with more accurately and quickly determining the most effective suturing configuration. In various embodiments, a trained artificial intelligence learning machine may be able to analyze images/videos of a suturing site and provide a suturing configuration for the suture site without the need for simulations.

The terms "artificial intelligence," "learning machine," and "machine learning" may include, but are not limited to, neural networks, deep neural networks, Bayesian Regression, Naive Bayes, Monte Carlo Methods, nearest neighbors, least squares, means, and support vector regression, among other data science and artificial science techniques. Exemplary implementations of an artificial intelligence learning machine can identify patterns and making predictions relating to appropriate suture placement, as described above.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

What is claimed is:

1. A tissue suturing guidance system, comprising:
an image capturing device configured to capture an image of a suture site, wherein the image capturing device comprises a stereoscopic camera that provides stereoscopic images of the suture site;
a display configured to display an image of the suture site; and
a processor in communication with the image capturing device and the display, the processor configured to:
determine, based on the stereoscopic images of the suture site, a geometric tissue representation of the suture site;
access measured properties of the suture site;
determine, based on the measured properties of the suture site, a biomechanical tissue representation of the suture site; and
generate, based on the geometric tissue representation and the biomechanical tissue representation of the suture site, a suturing configuration for the suture site, wherein in generating the suturing configuration, the processor is configured to:
simulate placements of sutures at target locations based on the geometric and biomechanical tissue representations of the suture site to generate the suturing configuration for the suture site; and
determine an effectiveness of the suturing configuration based on whether a simulation-derived pressure across a tissue-to-tissue interface of the suture site, as calculated by a biomechanically-based simulation of the suturing site, is within a predetermined range of pressures that promote tissue regrowth;
wherein the tissue-to-tissue interface corresponds to tissue faces of the suture site based on the geometric tissue representation of the suture site.

2. The tissue suturing guidance system according to claim 1, wherein in determining the geometric tissue representation, the processor is configured to perform three-dimensional surface reconstruction based on the stereoscopic images to determine the geometric tissue representation of the suture site.

3. The tissue suturing guidance system according to claim 1, wherein the image capturing device is further configured to perform multi-spectral imaging of the suture site to provide the measured properties of the suture site.

4. The tissue suturing guidance system according to claim 1, further comprising a memory storing tissue types and distributions, wherein the processor is further configured to determine the measured properties of the suture site based on the stored tissue types and distributions.

5. The tissue suturing guidance system according to claim 1, wherein the processor is further configured to receive input of a desired suture placement, and wherein in generating the suturing configuration, the processor is configured to generate the suturing configuration based on the desired suture placement.

6. The tissue suturing guidance system according to claim 1, wherein the processor is further configured to update the suturing configuration during a progression of a suture procedure.

7. The tissue suturing guidance system according to claim 6, wherein the suturing configuration includes at least one of suture type, suture tension, suture loop frequency, needle type, suture placement, or suture pathway.

8. The tissue suturing guidance system according to claim 6, wherein the progression includes one of a clinician or a robotic surgical system performing the suture procedure.

9. The tissue suturing guidance system according to claim 6, wherein the display is further configured to overlay the suturing configuration over the image of the suture site.

10. A method of tissue suturing guidance, the method comprising:
capturing, by an image capturing device, a suture site, wherein the image capturing device is a stereoscopic camera that provides stereoscopic images of the suture site;
displaying, by a display, an image of the suture site;
determining, based on the stereoscopic images of the suture site, a geometric tissue representation of the suture site;
accessing measured properties of the suture site;
determining, based on the measured properties of the suture site, a biomechanical tissue representation of the suture site;
generating, based on the geometric tissue representation and biomechanical tissue representation of the suture site, a suturing configuration for the suture site, wherein generating the suturing configuration includes simulating placements of sutures at target locations based on the geometric and biomechanical tissue representations of the suture site;
receiving input of a desired suture placement; and
determining an effectiveness of the suturing configuration based on whether a simulation-derived pressure across a tissue-to-tissue interface of the suture site, as calculated by a biomechanically-based simulation of the suturing site, is within a predetermined range of pressures that promote tissue regrowth.

11. The method according to claim 10, wherein determining the geometric tissue representation of the suture site includes performing three-dimensional surface reconstruction to determine the geometric tissue representation of the suture site.

12. The method according to claim 10, further comprising performing multi-spectral imaging on the suture site to provide the measured properties of the suture site.

13. The method according to claim 10, further comprising updating the suturing configuration during a progression of a suture procedure.

14. The method according to claim 13, further comprising overlaying the suturing configuration on the image of the suture site.

15. A tissue suturing guidance system, comprising:
an image capturing device configured to capture an image of a suture site, wherein the image capturing device comprises a stereoscopic camera that provides stereoscopic images of the suture site;
a display configured to display an image of the suture site; and
a processor in communication with the image capturing device and the display, the processor configured to:
determine, based on the stereoscopic images of the suture site, a geometric tissue representation of the suture site;
access measured properties of the suture site;
determine, based on the measured properties of the suture site, a biomechanical tissue representation of the suture site; and generate, based on the geometric tissue representation and the biomechanical tissue representation of the suture site, a suturing configuration for the suture site wherein, during a progression of a suture procedure, the processor is further configured to:

estimate, based at least on the progression of the suture procedure, whether there is inadequate or excessive pressure on a tissue-to-tissue interface of the suture site; and based on estimating that there is inadequate or excessive pressure on the tissue-to-tissue interface, providing an alert to adjust pressure across the tissue-to-tissue interface.

16. The tissue suturing guidance system according to claim 1, wherein the processor is further configured to:

receive input of a proposed needle penetration point and a suture;

determine whether a combination of the proposed needle penetration point, the suture, and properties of the tissue, may lead to undesired impact on the tissue; and provide a warning based on determining that the combination may lead to undesired impact on the tissue.

\* \* \* \* \*